July 2, 1968  R. T. GROVER  3,390,889
PACKING RING ORGANIZATION INCLUDING A SPLIT RING UNITARILY
COMPRISING PLASTIC AND METAL LAMINAE
Filed March 5, 1965  2 Sheets-Sheet 2
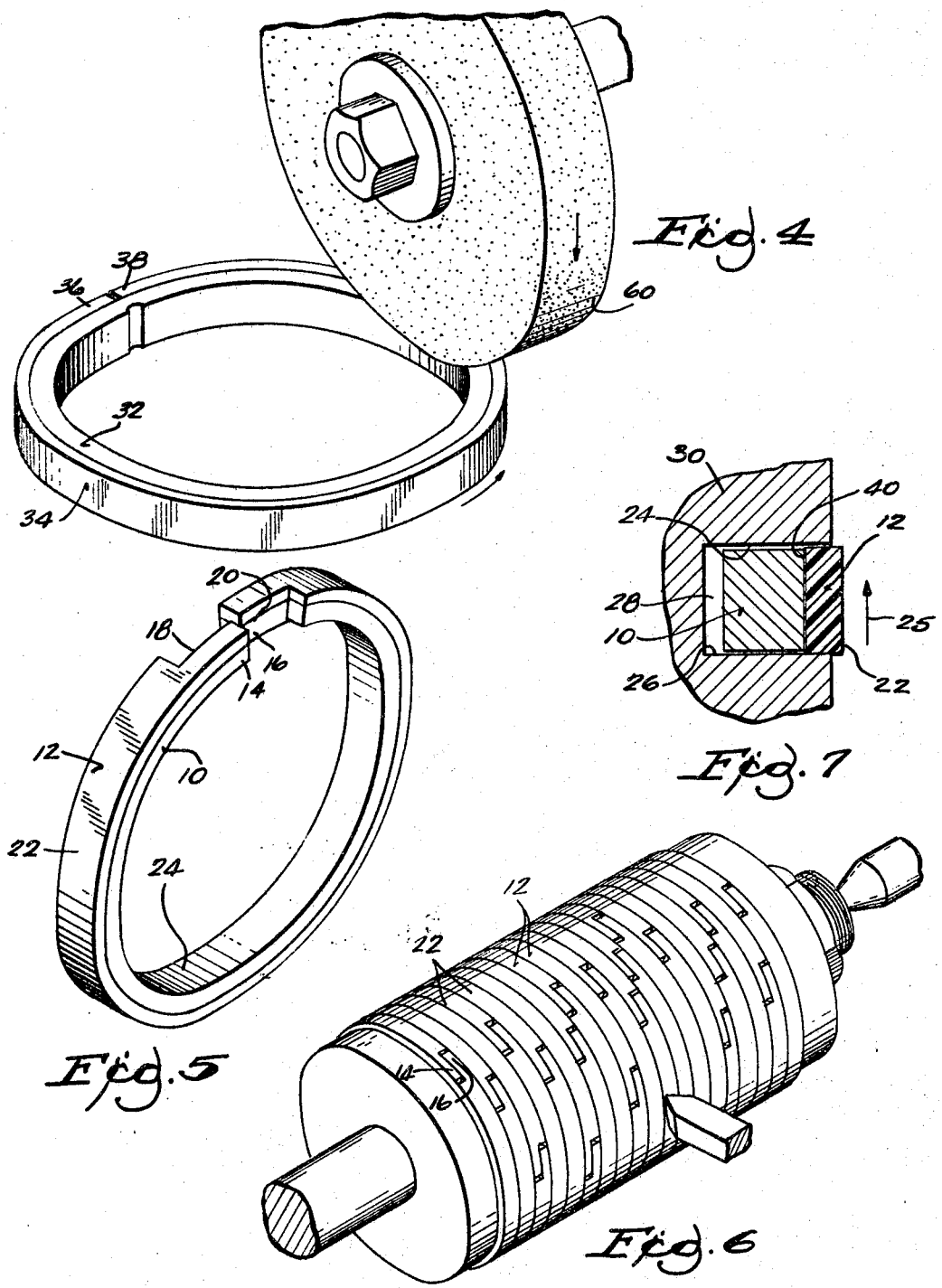
INVENTOR
RICHARD T. GROVER
BY Wheeler, Wheeler & Wheeler
ATTORNEYS

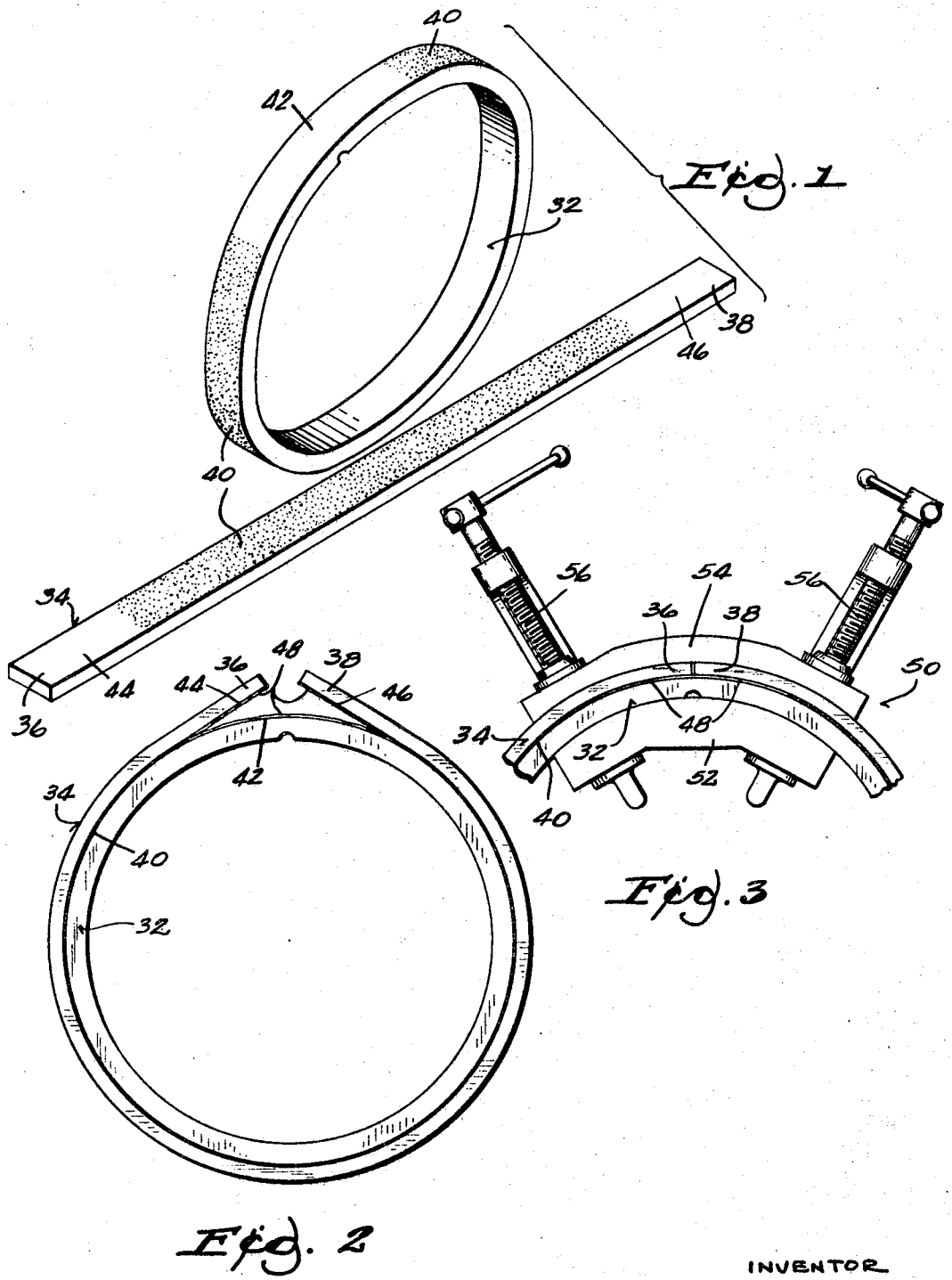

United States Patent Office 3,390,889
Patented July 2, 1968

3,390,889
PACKING RING ORGANIZATION INCLUDING A SPLIT RING UNITARILY COMPRISING PLASTIC AND METAL LAMINAE
Richard T. Grover, 3337 S. New York Ave., Milwaukee, Wis. 53207
Filed Mar. 5, 1965, Ser. No. 437,418
4 Claims. (Cl. 277—198)

ABSTRACT OF THE DISCLOSURE

A composite packing ring has, in unitary permanent connection, an inner supporting metallic split ring lamina and an outer sealing lamina of resin such as filled fluorocarbon resin, the outer lamina being approximately one-third the thickness of the composite ring, the composite ring being adapted to be used to seal relatively movable cylindrical parts, one of which has a channel in which the inner lamina is wholly enclosed, the outer lamina engaging a side wall of the channel as well as the surface of the other of said parts.

---

This invention relates to a packing ring organization including a split ring unitarily comprising plastic and metal laminae.

Particularly in the case of piston rings used in grooves either in the pistons or the cylinders of hydraulic or pneumatic apparatus, it is desirable to have a facing of synthetic resin on the peripheral bearing surface. A deposit made by spraying is not adequately thick or durable to serve the purposes of the present invention. It is contemplated that the ring herein disclosed will have its bearing surface provided by a synthetic resin facing in a strip cut from flat sheet stock of sufficient radial thickness as applied to a metal ring to lie partly within and partly outside of the annular channel in which the composite ring is disposed. It has also been proposed to make packing rings by cutting sections from tubes of resinous material. The present invention is much less expensive since the resinous facing is cut from a sheet.

It is important that the ring include a flexible base portion which can be held in circular form only by extraneous pressure and which has sufficient bias to maintain its resinous surface ply in operative wiping bearing contact with a complementary surface.

The advantages of the invention are achieved if cast iron or other resilient metal is used as the base ring, the surface ply bonded thereto having a radial thickness about one-third that of the composite ring. While nylon and other resins may be used, a preferred bearing lamination is made of "15 percent glass-impregnated" fluorocarbon resin, the resin in question being of the type sold under the trademark Teflon. Numerous filling materials other than fiberglas are available and may be used.

In the practice of the invention, I prefer to produce in any appropriate manner somewhat elliptical iron rings which will become circular when severed and ground and milled to produce a split ring with lap joints, the procedure being closely parallel to the manufacture of all-metal rings.

Before the solid elliptical ring is cut to form a split ring, the major portion of its periphery is treated with contact cement. A strip is cut from a sheet of resinous material to form the surface laminate. The strip has a width which is sometimes narrower but may sometimes be slightly in excess of the axial dimension of the ring blank. Its length is such that its free ends will substantially meet when lapped around the ring blank.

The strip has its intermediate portion coated with contact cement and the strip and the ring are then associated to cause the cement to adhere all of the intermediate portions of the strip to the coated portions of the ring blank, leaving the ends of the strip and the underlying portions of the ring blank free of connection.

The surfaces left free are then adhered with epoxy cement. A short clamp will suffice to hold the free ends of the strip proximate each other and in engagement with the ring blank until the epoxy has set.

Thereupon, the ring blank is severed at or near the point to which the free ends of the resin laminate are proximate and the free ends of the composite split ring are preferably machined to provide a conventional lap joint.

The end faces of the ring are now ground flat. The grinding wheel acts on the resinous material (if the laminate projects marginally) as well as on the metal portions of the composite ring. However, the resinous laminate yields slightly under the grinding wheel and then expands when the grinding wheel passes so that there is a minute axial projection of the laminate beyond the ground metal faces of the composite ring. This is desirable as it produces an extremely effective seal.

As preferred steps in the manufacture of the ring, the outside and inside of the ring are trued and sized by turning and boring operations which may be performed thereon individually. It is also possible to turn a group of rings collectively as shown diagrammatically in FIG. 6. Here, like rings have been assembled on a mandrel and compressed centripetally to lap their end joints and subjected to axial pressure for unitary handling. Under such pressure they are maintained in substantially circular form and the bearing surface is then turned to constitute a true cylinder. Upon release from the mandrel, the respective composite ring is complete and in readiness for use, unless it is found desirable to bore its inner periphery to size the ring.

In the drawings:

FIG. 1 is a diagrammatic view in perspective showing a step preliminary to the lamination of a strip of synthetic resin sheet stock to the periphery of a metal ring prior to the severance thereof to produce a split ring.

FIG. 2 is a view in side elevation showing an intermediate step in the lamination of the resin strip to the unsevered metal ring.

FIG. 3 is a fragmentary detail view in perspective showing the bonding of the free ends of the synthetic resin strip to the metal ring.

FIG. 4 is a view in perspective illustrating the ring during the operation.

FIG. 5 is a view in perspective showing the composite ring after it has been severed and the ends machined to provide a lap joint, if such a joint is desired.

FIG. 6 is a view in perspective showing diagrammatically the truing of the surfaces of a number of composite rings to assure that they will be of truly cylindrical form when the ends are lapped as in use (this step being an optional refinement because the ring shown in FIG. 6 is complete and usable in the form illustrated).

FIG. 7 is a very much enlarged fragmentary detail view showing a cross section of my improved ring as it appears when used in the annular groove of a piston, the piston being fragmentarily shown in section.

Apart from the desirable truing and sizing operations above mentioned, FIG. 5 shows a complete packing ring embodying the present invention. It comprises a split metal ring 10 having either on its outer or its inner periphery a lamination 12 of synthetic resin. The composite ring is a split ring having free ends 14 and 16 which may optionally be machined to provide any appropriate lap joint. As shown for purposes of exemplification, one axial side of the free end 14 has been cut away to provide a complementary bearing surface 20. When the ring is placed in the annular groove of a piston in accordance with conventional practice, the free ends 14 and 16 will be lapped for most of their length with the bearing faces 18 and 20 of such free ends in operative bearing engagement. The outer periphery 22 of the composite ring will be substantially cylindrical when the free ends are thus lapped and the same will be true of the inner periphery 24.

One laminate 10 of the composite ring is preferably made of metal. It may conveniently be made of cast iron in accordance with conventional practice. However, in contrast with conventional practice, it will be made much thinner than would be the case if the cast iron ring were to provide both of the inner and the outer peripheral surfaces 22 and 24 exposed. The difference in thickness is made up by the peripheral laminate 12 which, in the disclosed embodiment, provides the exterior peripheral bearing surface 22. It will be understood that it is broadly immaterial whether the invention is applied to an outside ring or an inside ring, only the inside ring being illustrated.

The laminate 12 is bonded throughout its extent to the laminate 10 and is identically contoured. The free ends 14 and 16 above referred to are the free ends of the composite ring including both of the laminae.

In preferred practice, the metal laminate 10 of the composite ring represents about two-thirds of the radial thickness of the composite ring while the synthetic resin laminate 12 represents about one-third.

A variety of synthetic resins may be used to make the outer laminar ring 12. In practice, I have found it desirable to use tetrafluoroethylene (Teflon) with 15 percent of fiberglas filler, the product being available in sheet form known commercially as "15 percent glass-impregnated Teflon." While other synthetic resins, particularly "Nylon," have very little friction in a ring for use in a compressor cylinder, the polymer above identified is preferred because of its negligible friction and its relatively high resistance to heat. It also has desirable elasticity.

One of the results of its elasticity, which might not be anticipated, is the fact that when the composite ring is machined either to grind its ends as shown in FIG. 4 or to make the lap joint shown in FIG. 5, the elastic polymeric laminate 12 yields slightly under pressure of the grinding or milling tools and then slightly expands. The result, as shown in exaggerated form in FIG. 7, is the fact that the resin laminate 12 is marginally exposed slightly to contact the respective side wall 27 or 26 of the ring groove 28 in piston 30 to which the ring moves under pressure. Ring movement is indicated by arrow 25 in FIG. 7. This provides a most effective seal and because of the elasticity and negligible friction of the synthetic resin the seal is achieved without impairing expansion and contracton or lateral movement of the ring within the piston groove. The same is true of those portions of the laminate 12 which lap and include parts of the bearing surfaces 18 and 20 of the split ends 14 and 16.

However, the invention is not limited to any particular synthetic resin nor to any particular filler therefor.

In the preferred practice of the invention, the manufacturing procedure is as follows:

A closed metal ring 32 is fabricated either by casting it individually or by cutting transversely through a cast tube. This closed ring is slightly elliptical in accordance with conventional practice, the object being to give radially expanding bias to the completed ring while allowing it to assume true cylindrical form when it is cut to provide free ends which are forced to overlapping position against the bias.

While the ring 32 still has no free ends, the polymeric resin strip is laminated thereto. The material used to make the outer laminate 12 is preferably prefabricated in the form of a strip 34 cut from a sheet of the appropriate material in a width substantially corresponding to the axial width of the ring 32 and of a length such that the extremities 36, 38 of strip 34 will substantially meet when the strip is laminated interiorly or exteriorly to the ring 32.

A major part of the periphery of the ring 32 and a corresponding major part of a surface of strip 34 are now coated with a contact cement as shown at 40. The area 42 of the metal ring 32 is left bare and the same is true of the surfaces 44 and 46 which are near the free ends 36, 38 of strip 34.

The surfaces of strip 34 and ring 32 which have been treated with contact cement at 40 are now associated as shown in FIG. 2, leaving the free ends 36 and 38 of strip 34 projecting. The contact cement is immediately effective and tightly secures the strip 34 to the ring 32 throughout most of the periphery of the ring.

Epoxy cement 48 is now applied to the surfaces 42, 44 and 46 of the ring 32 and the strip 34. Unlike the contact cement, epoxy cement requires a setting period. Accordingly, some form or clamp or clamps is used to hold the free ends 36 and 38 of strip 34 securely to the ring 32 until the epoxy cement has set. The showing in FIG. 3 is strictly diagrammatic, there being illustrated a clamp 50 having an inner jaw at 52 and an outer jaw 54 which engages the free ends 36 and 38 of the resin strip 34, the two jaws being tightened as by clamp screws 56 to maintain the parts under pressure until the epoxy cement has set.

It will be understood that almost any contact cement may be used. Therefore, we have not attempted to identify any particular contact cement. We know of none which is inappropriate for our purposes.

The epoxy cement is identified only because it is the best product known to us to achieve a permanent bond between the inner and outer laminates at the point where permanence of bond is essential, namely, the point at which the composite ring is to be severed and machined to make a split packing ring.

It is possible to use contact cement throughout but it is believed that the bond would not be adequate at the split ends of the composite ring. It would be possible to use epoxy cement throughout but because of the setting time required, it would then be necessary to clamp the outer strip 34 to the one-piece ring 32 throughout the periphery of the latter and this would require extra time and more complex clamping equipment. Accordingly, an ideal solution is to use the two different kinds of cement, one of which requires no clamping equipment and suffices to achieve adequate bond at all points other than the lap joint, the higher bond cement such as epoxy being needed then only in the zone where the joint is to be made. Ideally, the cement should have about the same temperature tolerance as the resin used.

The next step involves the facing of the ends of the composite ring. One way of doing this involves the use of a grinding wheel 60 as shown in FIG. 4. Both faces will normally be ground. As already noted, the relative pressure between the grinding wheel 60 and the face of the ring will somewhat deform the elastic laminar strip 34. Because of the elastic yielding of the resin, less material will be removed from the strip 34 than from the inner metal ring 10. As the wheel passes from contact with a given area, the expansion of the polymeric laminate causes it to project minutely above the level of the surface of the metal laminate. In consequence, the completed split ring has the characteristics already described that the projecting edge of the low friction plastic makes an exceptionally tight seal with the side walls of the channel in which the ring is located. The proportions of the parts are broadly immaterial but are preferably such that a major part of the thickness of the plastic laminate is within the channel and a lesser part of such thickness projects therefrom. Thus, the seal is actually made by the plastic laminate for which the metal packing ring provides resilient mechanical support.

The metal laminate not only provides the required tension and permanence of form but provides a support such that the resin which does the actual packing can be machined with accuracy.

I claim:
1. The combination with relatively movable inner and outer parts, one of which is provided with an annular channel, of a unitary composite packing ring in said channel and projecting therefrom to provide a seal between said parts, said ring comprising a split ring having relatively movable free ends and consisting of a metal lamina within the channel and a lamina of elastically yieldable resin partially within the channel and partially projecting therefrom into engagement with the other of said parts, said laminae being in permanently bonded connection and both of said laminae being of substantial thickness and extending from end to end of the split ring, the width of the resin lamina being slightly in excess of that of the metal lamina, whereby the resin lamina projects into sealing engagement with at least one side of the channel.

2. A combination according to claim 1 in which the resin lamina has a major portion of its thickness in the channel and the metal lamina has resilient bias outwardly of the channel toward said other part whereby to provide resilient support for the resin lamina.

3. A combination according to claim 1 in which the split ring has lapped joint surfaces on both laminae at its said free ends.

4. A combination according to claim 1 in which the resin lamina comprises a synthetic resin selected from the group which consists of nylon and fluoro-carbon resins.

References Cited

UNITED STATES PATENTS

| | | | |
|---|---|---|---|
| 684,617 | 10/1901 | Rathbun | 277—224 |
| 2,807,511 | 9/1957 | Fleming | 277—216 |
| 2,809,130 | 10/1957 | Rappaport. | |
| 3,072,413 | 1/1963 | Parks | 277—8 |
| 2,877,071 | 3/1959 | Arnot | 277—216 X |

FOREIGN PATENTS 767,322  7/1934  France.

LAVERNE D. GEIGER, *Primary Examiner.*

J. S. MEDNICK, *Assistant Examiner.*